(12) United States Patent
Maile et al.

(10) Patent No.: US 8,277,293 B2
(45) Date of Patent: Oct. 2, 2012

(54) HOLDING DEVICE

(75) Inventors: Bernd Maile, Oggelshausen (DE);
Armin Kibler, Eberhardzell (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 99 days.

(21) Appl. No.: 12/720,045

(22) Filed: Mar. 9, 2010

(65) Prior Publication Data
US 2010/0233949 A1 Sep. 16, 2010

(30) Foreign Application Priority Data

Mar. 13, 2009 (EP) ..................................... 09003701

(51) Int. Cl.
*A22C 11/00* (2006.01)
(52) U.S. Cl. ......................................................... 452/35
(58) Field of Classification Search .............. 452/21–26, 452/30–32, 35–37, 46–48, 51
See application file for complete search history.

(56) References Cited

U.S. PATENT DOCUMENTS

| | | | |
|---|---|---|---|
| 4,744,129 A | 5/1988 | Weerth | |
| 4,837,896 A * | 6/1989 | Lockard | 452/38 |
| 4,991,260 A * | 2/1991 | Nausedas | 452/35 |
| 7,467,993 B2 * | 12/2008 | Whittlesey et al. | 452/37 |
| 7,637,804 B2 * | 12/2009 | Jackel | 452/31 |
| 7,775,862 B2 * | 8/2010 | Whittlesey et al. | 452/37 |
| 7,867,068 B2 * | 1/2011 | Whittlesey et al. | 452/37 |
| 7,976,366 B2 * | 7/2011 | Whittlesey et al. | 452/45 |

FOREIGN PATENT DOCUMENTS

| | | |
|---|---|---|
| DE | 19517995 A1 | 11/1996 |
| EP | 0232812 A1 | 8/1987 |
| EP | 1260143 A1 | 11/2002 |
| EP | 1588621 A1 | 10/2005 |

OTHER PUBLICATIONS

European Search Report for 09003701.1, dated Apr. 23, 2009.
Eurasian Patent Office Communication for patent application No. 201070188/31, dated Nov. 21, 2011.
Notice of Opposition by VEMAG Maschinenbau GmbH to EP2227963, dated Apr. 5, 2012 (see text of IDS letter for English-language summary).
Drawing 836.000.000, dated Oct. 8, 1975.
Drawing 836.100.000, dated Sep. 12, 1990.
Auctioncalendar.eu announcement (IDA938662) for Jun. 29, 2011 Auction of VEMAG 836.
Auctioncalendar.eu announcement (ID A938670) for Jun. 29, 2011 auction of VEMAG Robot 3000 DC.
VEMAG Casing Holder Type 836—Aug. 1978 Sparepart Catalog.

(Continued)

*Primary Examiner* — Richard Price, Jr.
(74) *Attorney, Agent, or Firm* — Marshall, Gerstein & Borun LLP

(57) ABSTRACT

A holding device for a stuffing machine for stuffing sausages, having a head provided with a casing brake, and a drive shaft through which the casing brake can be driven, the casing brake enclosing the free end of a filling tube of the stuffing machine at an operating position and exposing the free end of the filling tube by pivoting the head away at a sausage casing pull-on position. When the head is being moved from the operating position to the sausage casing pull-on position, the drive shaft is deflected at an angle α relative to the longitudinal axis of the holding device without decoupling of the power train.

27 Claims, 13 Drawing Sheets

OTHER PUBLICATIONS

Darmhaltevorrichtung Typ 836 (Casing Holder 836) Manual and maintenance instructions.

Explanation of Dr. Franz Xaver Grimiller in support of Opposition (with English summary).

VEMAG Darmhaltevorrichtung Typ (Casing Holder Type) 836 invoice, purportedly dated May 8, 2006.

Explanation of Erich Hogrefe in support of Opposition (with English summary).

Mar. 22, 2012 print of VEMAG Darmhaltevorrichtung Typ (Casing Holder Type) 836 shipping notice, purportedly dated May 5, 2006.

Announcement of Apr. 24, 2004 Live and Webcast Auction—Company Inzerdorfer Food Processing Corporation (lot/Pos. 171, 172—VEMAG Robot 3000 DC 124 & VEMAG Robot 1000 DC 126, with gut holding equipment DHV 836, at pp. 12-13, 18).

Explanation of Eduard Porath in support of opposition to EP2227963 by VEMAG of purported 2008 sale to TECHNOCARE (with English summary).

Explanation of Eduard Porath in support of opposition to EP2227963 by VEMAG of KUPO GMBH repair invoices Feb. 1993 to Nov. 2005.

Explanation of Klaus Schroter in support of opposition to EP2227963 by VEMAG.

Sep. 21, 2011 print of VEMAG Casing Holding Device Type 836 order confirmation (Atameh Pars Teyhoo Co.), purportedly dated Jul. 11, 2005.

VEMAG Case Holding Device Type 836 invoice, purportedly dated Nov. 11, 2005.

Efector 400® Mar. 6 2003 product information sheet E60022 (coil clutch).

Sep. 21, 2011 print of VEMAG Casing Holding Device Type 836 order confirmation (Riehl Logistik GmbH), purportedly dated May 5, 2006.

Kupo GmbH packaging slip—TECHNOCARNE, purportedly dated Apr. 8, 2008.

VEMAG Machinenbau GmbH —Allgemeine Bedingungen für die Lieferung von Mashinen (General conditions for supply of machines).

* cited by examiner

HOLDING DEVICE

CROSS-REFERENCE TO RELATED APPLICATION

The present application claims the benefit of priority of European Patent Application No. 09003701.1, filed Mar. 13, 2009. The entire text of the priority application is incorporated herein by reference in its entirety.

FIELD OF THE DISCLOSURE

The disclosure relates to a holding device, and to a stuffing machine including such a holding device and a method of positioning such a holding device, such as used in sausage processing operations.

BACKGROUND

Such a holding device is known from the prior art. The end face of a stuffing machine used for stuffing and twisting off sausages has normally provided thereon the twist-off gear unit from which a filling tube projects horizontally. For producing the sausages, the sausage casing is pulled onto the filling tube, said casing being then gradually pulled off the filling tube during the stuffing and twist-off operations. In automatic sausage production, casing brakes are used, which tighten and decelerate the casing on the filling tube during stuffing. The casing brakes are installed in the holding device. The holding device has the function of holding the casing brake in position. In the case of driven brakes, a power train is accommodated in the holding device, said power train accelerating and decelerating the casing brake e.g. in synchronism with the filling tube.

When occupying the operating position, the holding device and the casing brake, respectively, enclose the free end of the filling tube. In view of the fact that the casing brake must encompass the free end of the filling tube in the operating position, that free end is not accessible in the operating position. Hence, the brake ring housing must be pivoted away for pulling on new ruffled casings.

There are two types of holding devices:

a first holding device is shown e.g. in connection with FIG. 9a, the head 3 of the holding device 1 being first moved linearly in the axial direction of the holding device and in the direction of the axis of the filling tube, respectively, by actuating a pivot lever 9, and, subsequently, it is moved upwards or downwards. The holding device is here arranged on a housing 4 of the twist-off gear unit. This system entails the drawback that, when the brake head is pivoted away about the horizontal axis, it may collide with subsequent processing equipment. When the head 3 is pivoted away in the downward direction, it collides e.g. with the product on the table. When it is pivoted away in the upward direction, the filling tube will be less easily accessible for pulling on the casing.

As can be seen from FIG. 9b, holding devices with a circular movement of the head about a vertical axis are known as well. Such a device is especially also shown in connection with FIGS. 10 and 11. By actuating a pivot lever 9, the head 3 of the holding device 1 is moved, together with the casing brake, first linearly in the direction of the axis of the filling tube and, subsequently, it is pivoted away about a vertical shaft A. The vertical shaft A is arranged such that the radius of the pivotal movement will suffice for pivoting the brake away from the filling tube 7 without any collision taking place. In the case of driven brakes, it will here, however, be necessary to decouple the power train, i.e. the drive shaft in the holding device must be decoupled from the drive on the housing of the twist-off gear unit, in this case at point B, since it is not possible to maintain the power train in alignment. This has, among other effects, the effect that the angular position of the brake relative to the filling tube gets lost. The movement takes place radially about the fixed center of rotation A, which is located at a comparatively large distance from the drive shaft. The resultant movement is therefore also disadvantageous in view of various disturbing edges.

SUMMARY OF THE DISCLOSURE

It is therefore an aspect of the present disclosure to provide a holding device as well as a suitable method, which allow the casing brake to be pivoted from an operating position to a sausage casing pull-on position in an easy and convenient manner.

The holding device head including the casing brake can thus be moved easily from an operating position to the sausage casing pull-on position with the holding device according to the present invention. In the course of this movement, the drive shaft is deflected at an angle relative to the longitudinal axis L of the holding device without decoupling of the power train. The longitudinal axis L extends in the longitudinal direction through the drive shaft in the operating position and it extends parallel to the longitudinal axis of the filling tube. According to the present disclosure, it is no longer necessary to decouple the drive shaft, i.e. the power train, from the drive, as is the case in the prior art (cf. point B). Hence, a pivotal movement of the head is accomplished, in the case of which the head is no longer pivoted upwards or downwards about a horizontal axis, as is the case in the prior art. It follows that a collision with subsequent processing equipment can be avoided. Due to the fact that decoupling is not necessary, the angular position of the brake relative to the tube will not get lost either.

According to an advantageous embodiment, this angle is an angle between 4° and 90°, in particular between 10° and 45°. This will guarantee that the filling tube end is easily accessible.

It will be particularly advantageous when a guide means, especially a slotted or linked guide, is provided, with the aid of which the head is first moved linearly in the axial direction, i.e. in the direction of the longitudinal axis forward. When the brake has been exposed, the head continues its movement along a predetermined path until the filling tube is easily accessible to the operator. When moving along the path, the head moves in a direction away from the longitudinal axis L, the head executing on this path preferably a superimposed movement in the axial direction of the holding device and in at least one direction extending at an angle relative to the longitudinal axis L. By combining various guides and paths, an arbitrary movement can be carried out. Due to the fact that the movement carried out is first an axial movement and then a movement away from the longitudinal axis L, a small pivoting angle will suffice. Due to the small pivoting angle, the power train need not be decoupled, since this angle error can be compensated. The path of movement of the head advantageously lies in a plane including the longitudinal axis L of the drive shaft, preferably in a horizontal plane. The path of movement may, however, also lie in a plane that is inclined at an angle relative to the horizontal plane.

According to a preferred embodiment, the drive shaft is, at least partially, rotatably supported in a support tube, which is displaceably supported in a housing and at the front end of which the head with the casing brake is mounted, said support tube being provided with a guide element running in a linked guide in the housing, and the holding device additionally comprising a pivot means, in particular in the form of a pivot lever, with the aid of which the guide element can be moved in said guide means. Making use of this embodiment, the drive shaft can be deflected at a specific angle relative to the longitudinal axis L by moving the support tube in a respective guide means, said deflection taking place such that the filling tube end can be exposed in the sausage casing pull-on position. The movement can be executed easily by the user by moving the pivot means, in particular by moving a pivot lever. This kind of holding device can be manufactured easily and at a reasonable price and it is easy to operate. It is therefore possible that the head of the holding device first moves, together with the support tube, forwards along the longitudinal axis L, while the housing remains stationary, and that, subsequently, a superimposed movement takes place in the course of which the head, together with the support tube, continues its movement out of the housing in the axial direction, while the housing is moved away from the longitudinal axis.

The holding device comprises a housing through which the drive shaft extends, and it additionally comprises a joint so that the housing is movable at an angle relative to the longitudinal axis L. It follows that, via the joint at the rear end, also the housing can be pivoted by the angle et together with the drive shaft. This arrangement allows a good, free movability of the housing relative to the longitudinal axis L. Disadvantageous disturbing edges can be avoided.

According to an advantageous embodiment, the shaft comprises a compensation element which allows a deflection of the drive shaft relative to the longitudinal axis L of >4°, in particular >5°. Such a compensation element or compensating coupling allows the drive shaft to be deflected for moving it into the sausage casing pull-on position. A possible deflection range of at least up to 45° is particularly advantageous.

It will be of advantage when the compensation element is implemented as an axially resilient helical profile provided in the drive shaft. The compensation element is provided in the end portion, preferably in the rear third of the drive shaft. Since the axis of rotation of the head is therefore located in the rear portion of the drive shaft, the necessary pivoting angle will be small. This pivoting angle can easily be compensated for by the compensation element, so that the power train need not be decoupled.

According to an advantageous embodiment, the compensation element is arranged in an area within the joint, so that, with the movement of the drive shaft, the housing can move freely relative to the longitudinal axis L, whereby a particularly stable arrangement can be realized.

It will be advantageous when the guide means is arranged in the form of a linked guide in at least one plate in the housing. Such a plate, provided e.g. with a groove or an opening, is particularly easy to manufacture and it can be adapted individually to specific demands by modifying or combining various successive guide means (paths). The guide means can also be realized by superimposing various guide means with different paths. It is also possible to superimpose a plurality of plates provided with respective guide means, so as to accomplish a suitable superimposed movement.

According to a preferred embodiment, the head is pivoted out automatically by means of an actuator, in particular a pneumatic cylinder. Said automatic pivoting can then be executed in an advantageous manner, e.g. at the end of a ruffled casing, or after a predetermined number of ejected portions, by means of the actuator. The pivotal return movement to the operating position, when a new sausage casing has been pulled on, can then be executed again automatically via the actuator or, for safety reasons, again by the operator by means of a lever.

The present disclosure allows the holding device to be fixedly connected to a housing of the twist-off gear unit. This is possible in view of the fact that the power train need not be decoupled. The whole device is thus simplified substantially.

A stuffing machine for stuffing sausages comprises, according to the present disclosure, a suitable holding device for holding and positioning the casing brake.

According to a second embodiment of the present disclosure, the holding device does not comprise a drive shaft through which the casing brake can be driven, but a casing brake which is either driven via the filling tube or which is stationary. The holder for the head including the casing brake can therefore also be deflected at the angle α relative to the longitudinal axis L of the holding device. It follows that, also in this case, the head can first be moved linearly in the axial direction, i.e. in the direction of the longitudinal axes forward. Once the brake has been exposed, the head continues its movement along a predetermined path until the filling tube end is easily accessible to the operator. When moving along the path (linear or curved), the head moves in a direction away from the longitudinal axis L, the head executing on this path preferably a superimposed movement in the axial direction forward and in at least one direction extending at an angle relative to the longitudinal axis L. Also in this embodiment, the path can lie in a plane including the longitudinal axis L, preferably in the horizontal plane, in correspondence with the first embodiment.

DETAILED DESCRIPTION OF THE PREFERRED EMBODIMENT

Figure 1:
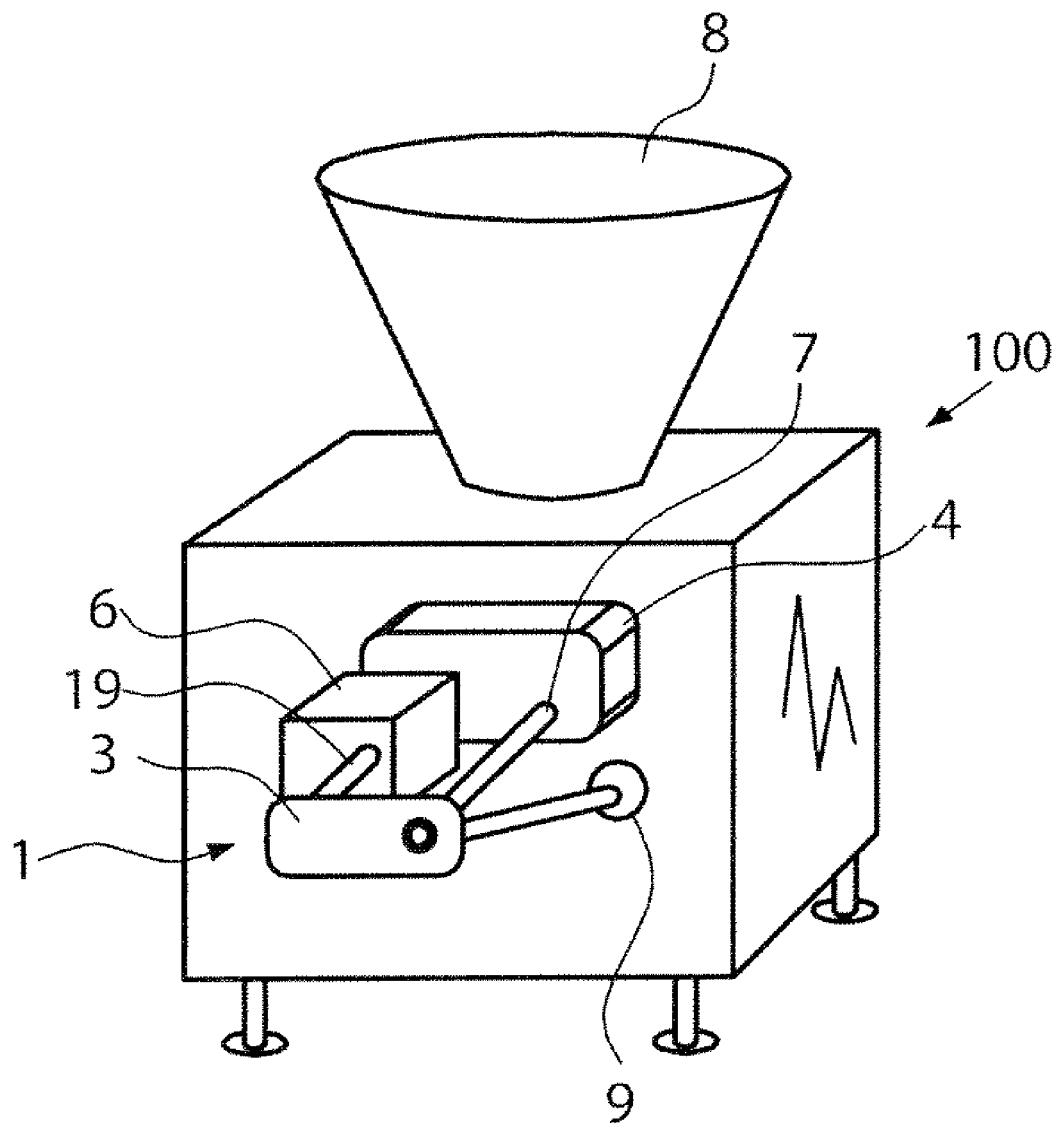
FIG. 1 shows in a perspective view a holding device together with a stuffing machine according to the present disclosure.

FIG. 1 shows in a perspective view a stuffing machine comprising a holding device 1 according to the present disclosure. Reference numeral 100 designates in FIG. 1 a machine for stuffing and automatically twisting off sausages in its entirety.

The machine has sausage meat supplied thereto via a hopper 8, said sausage meat being then ejected through the filling tube 7 with the aid of means which are not shown in detail and which are used for portioning the sausage meat and stuffing it into casings. For stuffing the sausage meat into casings, a ruffled casing is pulled onto the filling tube 7 from the front free end 5 of said filling tube. After the ejection of an adjusted amount of sausage meat, the filling tube 7 is rotated about its own axis by a twist-off gear unit arranged in the housing 4, so as to achieve a constriction of the stuffed portion.

Figure 2:
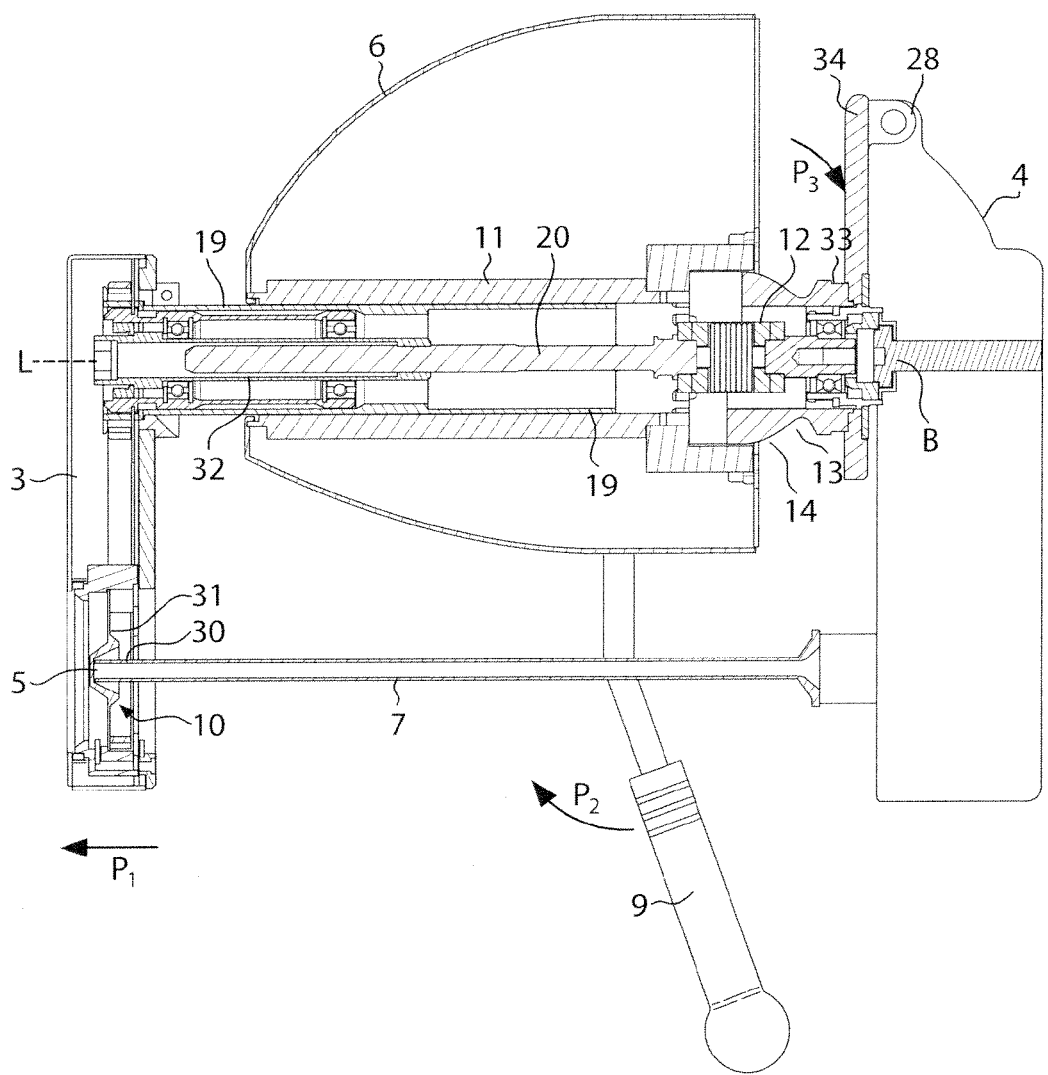
FIG. 2 shows a horizontal section through the holding device according to the present disclosure at an operating position.

The holding device 1 has ahead 3 which, as can be seen in FIG. 1, encloses at an operating position the free end 5 of the filling tube 7 with a through-hole 30 (cf. also FIG. 2). The through-hole 30 has arranged therein the actual casing brake 10 which comprises a brake ring 31. The brake ring decelerates the pull-off movement of the ruffled casing during the stuffing process, so that the necessary tension of the casing to be stuffed will be given. In order to prevent the filling tube from slipping during twist-off, the casing brake 10 is adapted to be driven so that it can rotate together with the filling tube 7, e.g. at the rotational speed of said filling tube. While the filling tube 7 carries out the rotational movement about its longitudinal axis within the casing, said casing is taken hold of by the brake ring from outside and rotated in synchronism with the rotation of the twist-off spout.

Since the casing brake 10 in the head 3 encloses the free end of the filling tube at the operating position, said free end 5 is not freely accessible at this operating position. For pulling on new ruffled casings, it will therefore be necessary to pivot the head 3 with the casing brake 10 away. The disclosure allows this in the advantageous way which will now be described in more detail in the following.

FIG. 2 shows schematically an embodiment of the holding device 1 according to the present disclosure at the operating position. FIG. 2 represents a horizontal section through the holding device. The holding device 1 is provided with a head 3 comprising the casing brake 10. As described above, the brake rubber 31 of the casing brake 10 encloses the filling tube 7 at the operating position. The brake ring is arranged in a brake ring housing. The brake ring 31 can now be driven, as has been described hereinbefore. The drive in the holding device 1 is effected via the coupling point B and the drive shaft 20 extending along the longitudinal axis L and driving—via a gear drive which is not described in detail and which is provided in the head 3—the brake ring 31 and its holder. The drive shaft 20 is engaged at the coupling point B so as to be driven by a gear unit which is not explained in detail and which is arranged e.g. the in the housing 4.

The drive shaft 20 is here, at least partially, rotatably supported in the support tube 19. As indicated by the arrow $P_1$ in FIG. 2, the support tube 19 is arranged such that it is axially movable in the holder 11. In the front end area of the support tube 19, which faces away from the stuffing machine, the sleeve 32 is provided, which is engaged by the drive shaft 20 in a longitudinally displaceable manner, the connection being implemented such that it transmits a torque; the above described gear drive is driven via the sleeve 32 so as to rotate the casing brake. The head 3 of the holding device is fixedly connected to the support tube 19 and axially movable therewith in the direction of the arrow $P_1$.

The holding device additionally comprises an external housing 6 through which the drive shaft 20 extends. The drive shaft 20 extends beyond the rear end of the housing 6 up to the coupling point B, i.e. the rear end of the housing 6 is spaced apart from the coupling point B, here the housing 4 for the twist-off gear unit. The distance is dimensioned such that, when the holding device 1 is moved to a sausage casing pull-on position (FIG. 3), the housing 6 will not strike against the housing 4 for the twist-off gear unit or a housing of the stuffing machine.

The drive shaft 20 has in the rear area, i.e. the area facing the stuffing machine 100, a compensation element 12. The compensation element 12 is advantageously provided in the rear third of the drive shaft 20. This compensation element allows a movement of the head from the operating position to the sausage casing pull-on position without decoupling the power train, i.e. without the necessity of decoupling the drive shaft 20 at the coupling point B from the drive gear. It follows that, due to the compensation element 12, the drive shaft 20 can be deflected by an angle α (cf. FIG. 3) relative to the longitudinal axis L. The angle α is typically an angle in the range of 4 to 45°, but it may also be an angle up to 90°.

It follows that the pivot axis of the movement of the drive shaft lies in an area of the compensation element 12. The pivot axis may extend vertically or at an angle to the vertical.

Figure 8A:
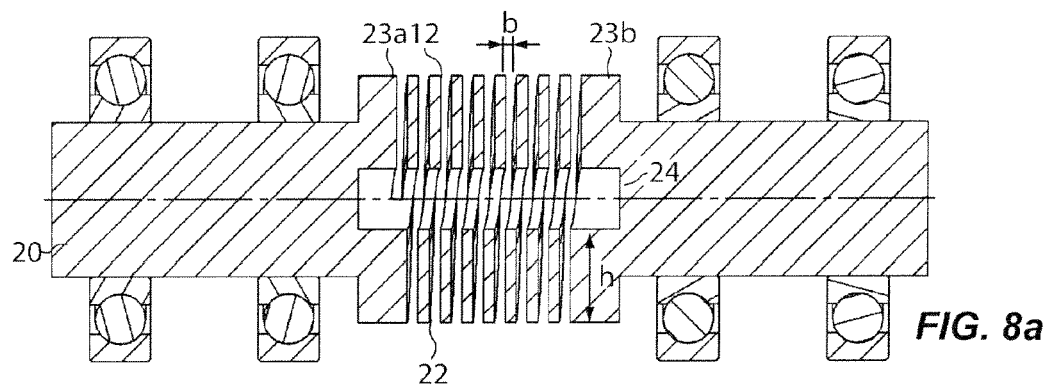
FIG. 8a shows schematically a s ct on through a segment of the drive shaft with a compensation element.

Such a compensation element is explained in more detail in FIG. 8*a, b* and *c*. FIG. 8*a* shows in a highly schematic representation a section of the drive shaft 20 with the compensation element 12. The shaft 20 can be manufactured from one piece together with the compensation element 12 so that the drive will be free from backlash and, consequently, free from wear. The drive shaft 20 can, however, also be manufactured from a plurality of parts, e.g. by a backlash-free joining method (e.g. clamping, welding etc.). The compensation element 12 is here incorporated in the drive shaft 20 in the form of a helical profile. In the present embodiment, the helical profile comprises first an enlarged portion 23*a, b* in the front and rear areas for the purpose of stabilization, the width of said enlarged portions 23*a* and *b* being larger than the cross-section of the drive shaft 20 in the neighbouring portions. The enlarged portions 23*a* and *b* have provided between them a helical profile, said helical profile extending in the form of a flat annular coil 22 about the preferably hollow-cylindrical opening 24 in the shaft. The helical profile has a specific web height h, web width b, a specific number of windings, and it consists of a specific material having a suitable modulus of elasticity. By a suitable selection of the above-mentioned parameters, different characteristics of the helical profile can be determined independently of one another.

Figure 8B:
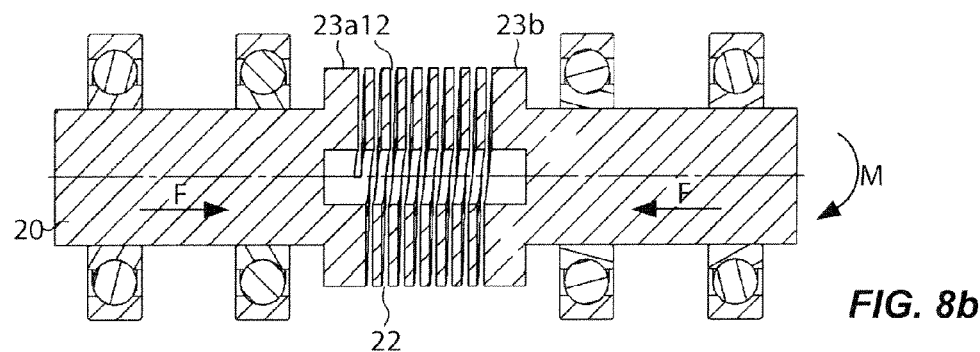
FIG. 8b shows the shaft shown in FIG. 8a with a compressed compensation element.

Due to the compensation element 12, the drive shaft can be designed such that, during operation, it can be deflected even by an angle of up to α>4°, in particular >5° (cf. FIG. 8*c*) without any damage being caused. As can be seen from FIG. 8*b*, the helical profile is incorporated such that it is axially resilient and has a specific spring rate. As can be seen from FIG. 8*b*, the helix can be compressed by a specific spring excursion when forces F act axially on the helical profile.

Figure 8C:
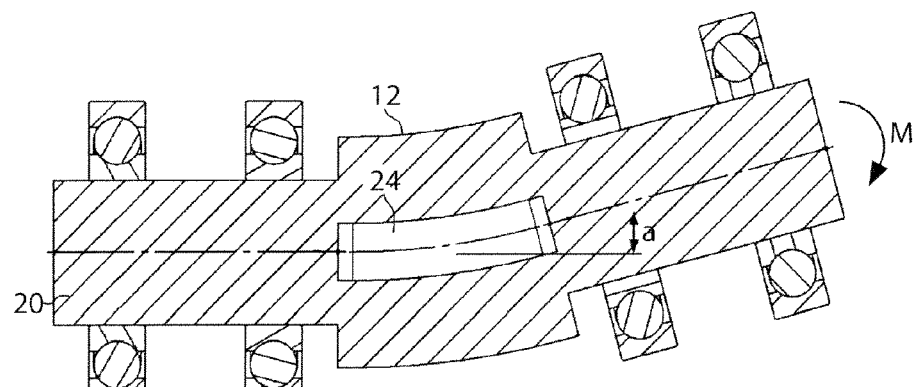
FIG. 8c shows the shaft shown in FIGS. 8a and 8b with a bent compensation element, in a highly simplified representation.

Hence, a certain axial and lateral compensation can be realized, a circumstance which will especially also be of advantage at the operating position when the stuffing machine is in operation. The compensation element 12 can also transmit a predetermined torque and it operates without any backlash whatsoever. It follows that, for pivoting the holding device away, a deflection of >4° up to 45° will typically be possible. FIG. 8c is a strongly simplified representation in which the helical profile is not shown in detail.

Figure 3:
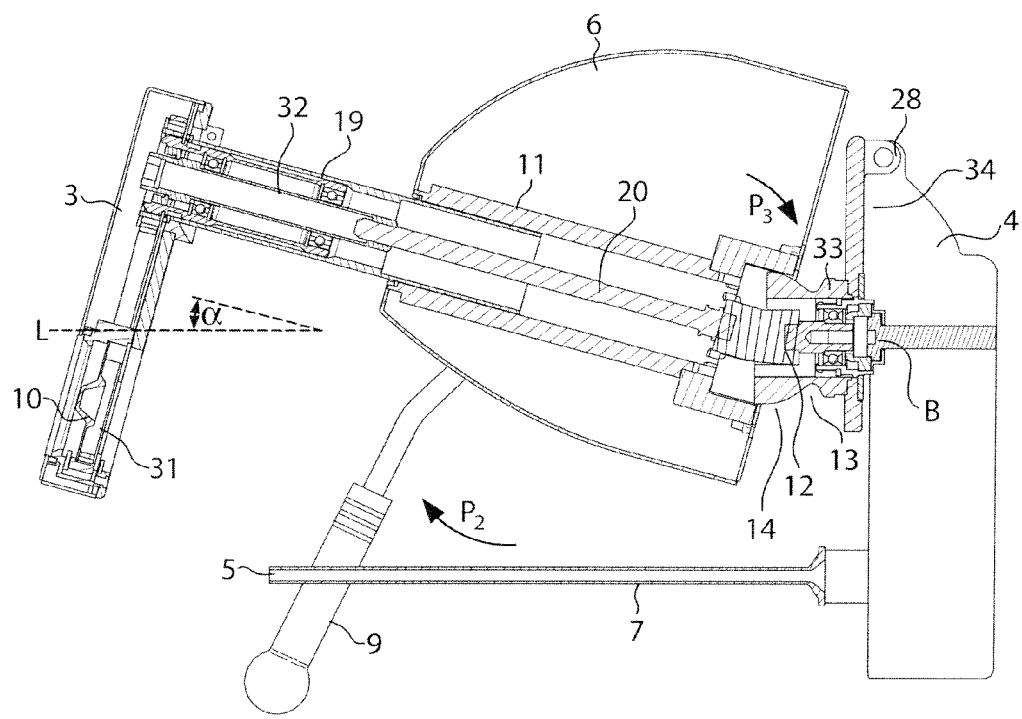
FIG. 3 shows the holding device according to FIG. 2 at a pivoted-out sausage casing pull-on position.
Figure 10:
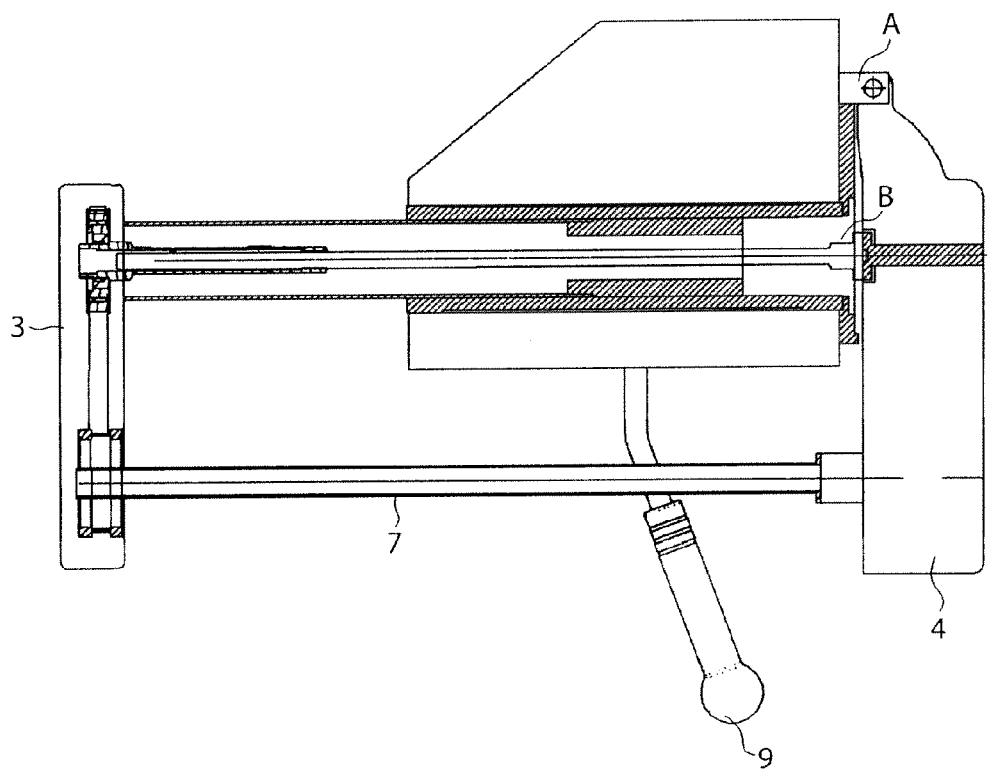
FIG. 10 shows a horizontal section through a holding device at the operating position according to the prior art.
Figure 11:
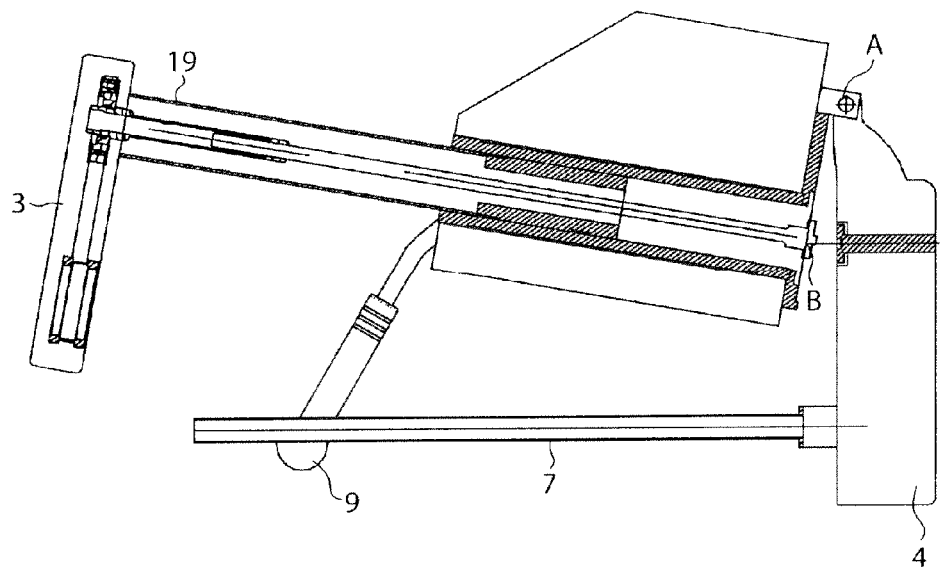
FIG. 11 shows the holding device according to FIG. 10 at a sausage casing pull-on position according to the prior art.

In the rear end portion of the holding device, the joint 13 (e.g. hinge-joint) is provided in such a way that the housing 6 can be moved relative to the longitudinal axis L at an angle (cf. FIG. 3). The drive shaft 20 extends through the joint 13, and the joint head, which has a spherical outer contour, extends outwards beyond the housing 6 in the direction of the stuffing machine 100. The spherical outer contour is provided for reasons of improved sealing. Although not shown in detail, the housing 6 may comprise a sealing element, in the form of an annular sealing lip, at point 14, said sealing element sealing the gap between the joint head and the housing 6. The joint, in this case the joint head 13, is followed by a portion 33 which surrounds and supports the shaft 20 and which has secured thereto a holder 34 through which the holding device 1 is secured in position at point 28 of the housing 4. It will be of advantage when the holding device 1 can be attached or fixed to said point 28 such that it is movable about a vertical axis of rotation, since the drive shaft 20 can then easily be pivoted to and arrested at the coupling point B when the holding device is being installed. This type of arrangement also allows the holding device 1 according to the present disclosure to be coupled to existing systems (cf. FIGS. 10 and 11).

Figure 12:
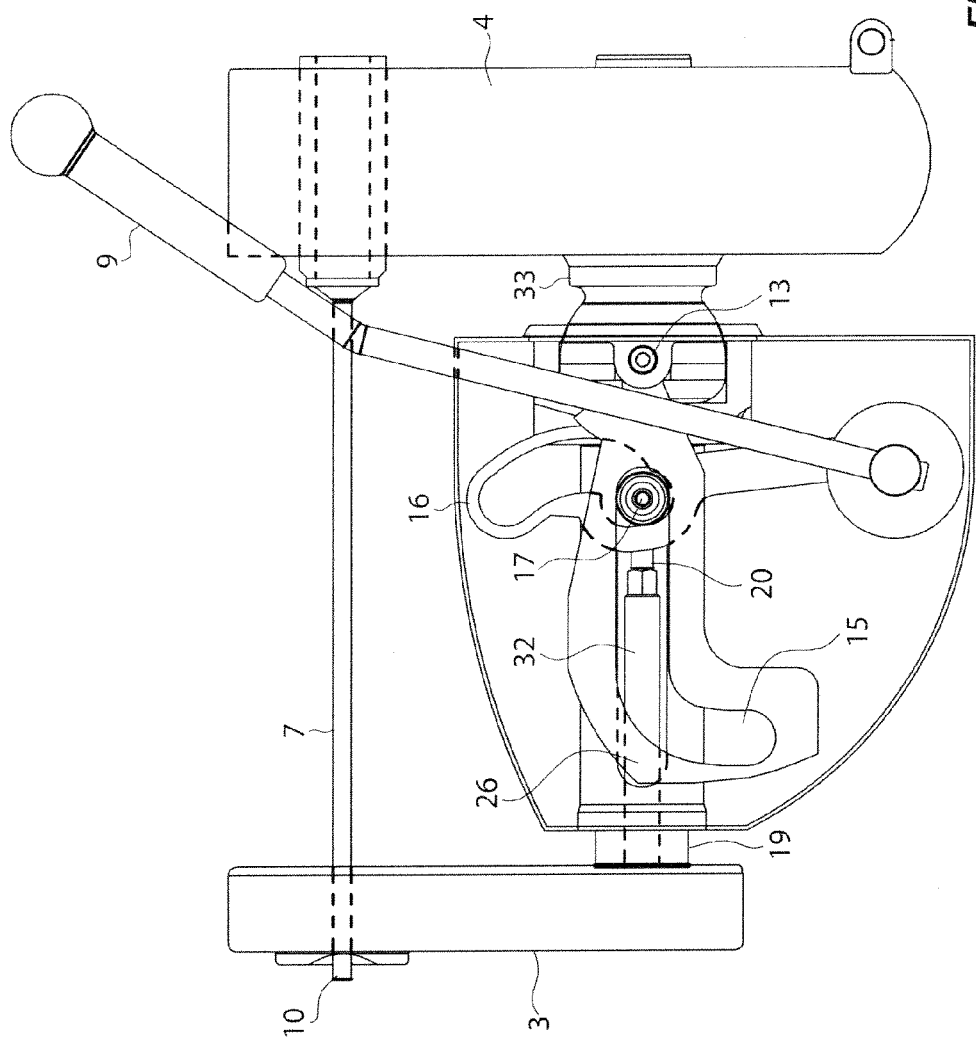
FIG. 12 shows a sectional view of a further embodiment of the holding device from below.

As can especially be seen from FIG. 12, the portion 33 may, however, also be fixedly connected to the housing 4, so that also the coupling point B of the power train between the holding device 1 and the housing 4 can be dispensed with, since the drive shaft 20 can then be supported in the housing 4. Hence, the housing 4 and the holding device 1 can define an inseparable unit.

It will be advantageous to provide the compensation element 12 in the rear third of the drive shaft 20, so that only a small angle $\alpha$ will be necessary for exposing the filling tube end 5 to a sufficient extent. The compensation element 12 is advantageously provided within the joint 13, so that, when the drive shaft 20 moves, the housing 6 can freely move relative to the longitudinal axis L, whereby a particularly stable arrangement will be realized.

Figure 9A:
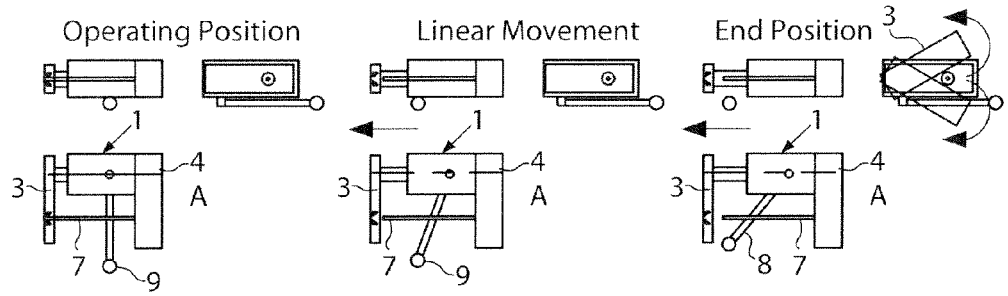
FIG. 9a shows schematically the operating position, the linear movement and the end position of a holding device according to the prior art.
Figure 9B:
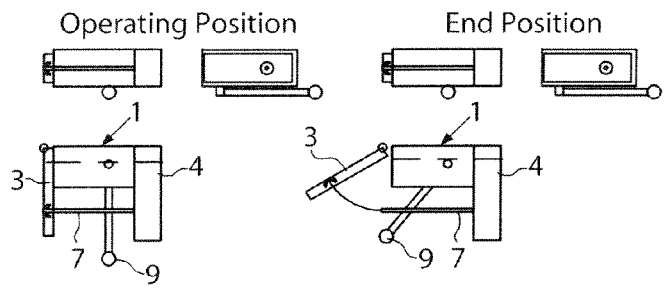
FIG. 9b shows schematically an operating position and an end position of a second embodiment of a holding device according to the prior art.
Figure 9C:
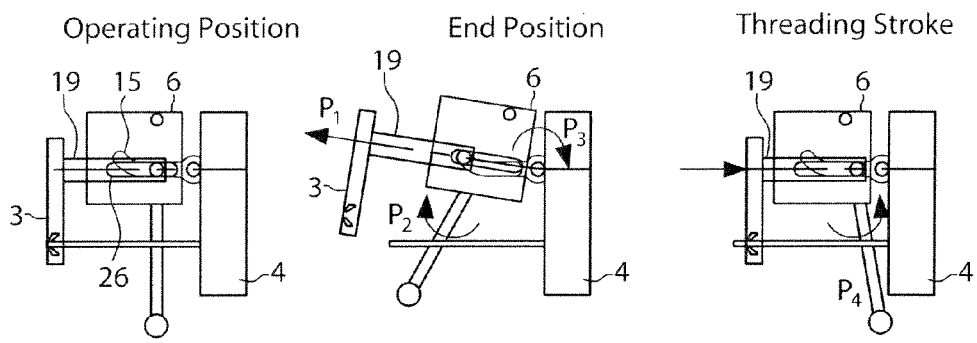
FIG. 9c shows schematically the operating position, the end position and the threading stroke according to the present disclosure.

As can especially be seen from FIGS. 2, 3 and 9c, the head 3 of the holding device 1 can first be moved axially, as indicated by arrow $P_1$, by actuating the pivot lever 9 in the direction $P_2$. The head 3 can then be pivoted along a path in a direction away from the longitudinal axis L of the holding device 1 by moving the pivot lever 9 further in direction $P_2$, so that the drive shaft 20 will be pivoted together with the housing 6 in the way indicated by arrow $P_3$. Along this path, the head preferably executes a superimposed movement in the axial direction and in at least one direction extending at an angle to the longitudinal axis L. The path extends in a plane including the longitudinal axis L, preferably in a horizontal plane or in a plane which is inclined relative to the horizontal plane.

A possible embodiment which shows how the movement of the head 3 is produced is explained in more detail in connection with FIGS. 5 and 6.

Figure 5:
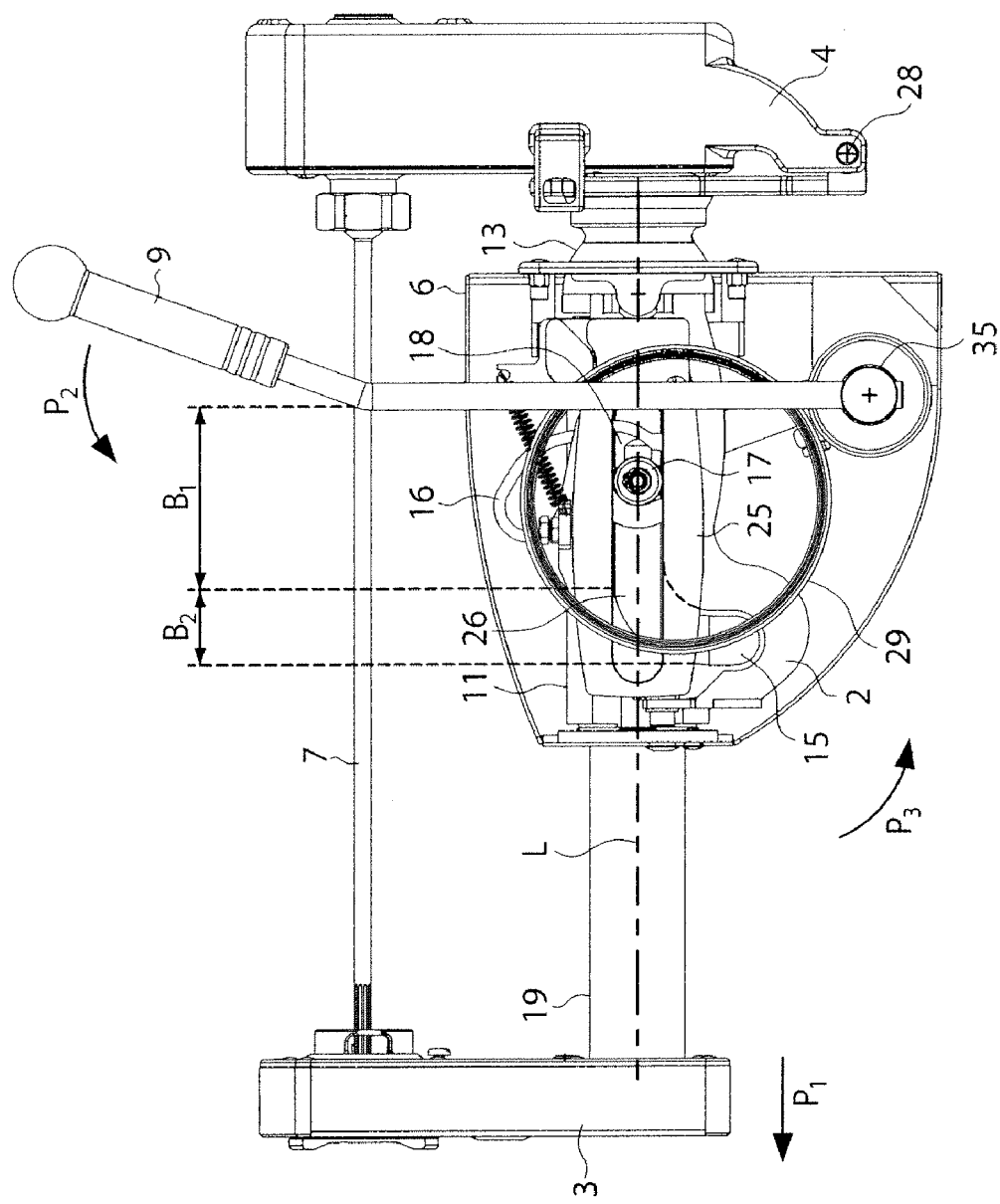
FIG. 5 shows a schematic view of the holding device according to the present disclosure from below at an operating position.
Figure 6:
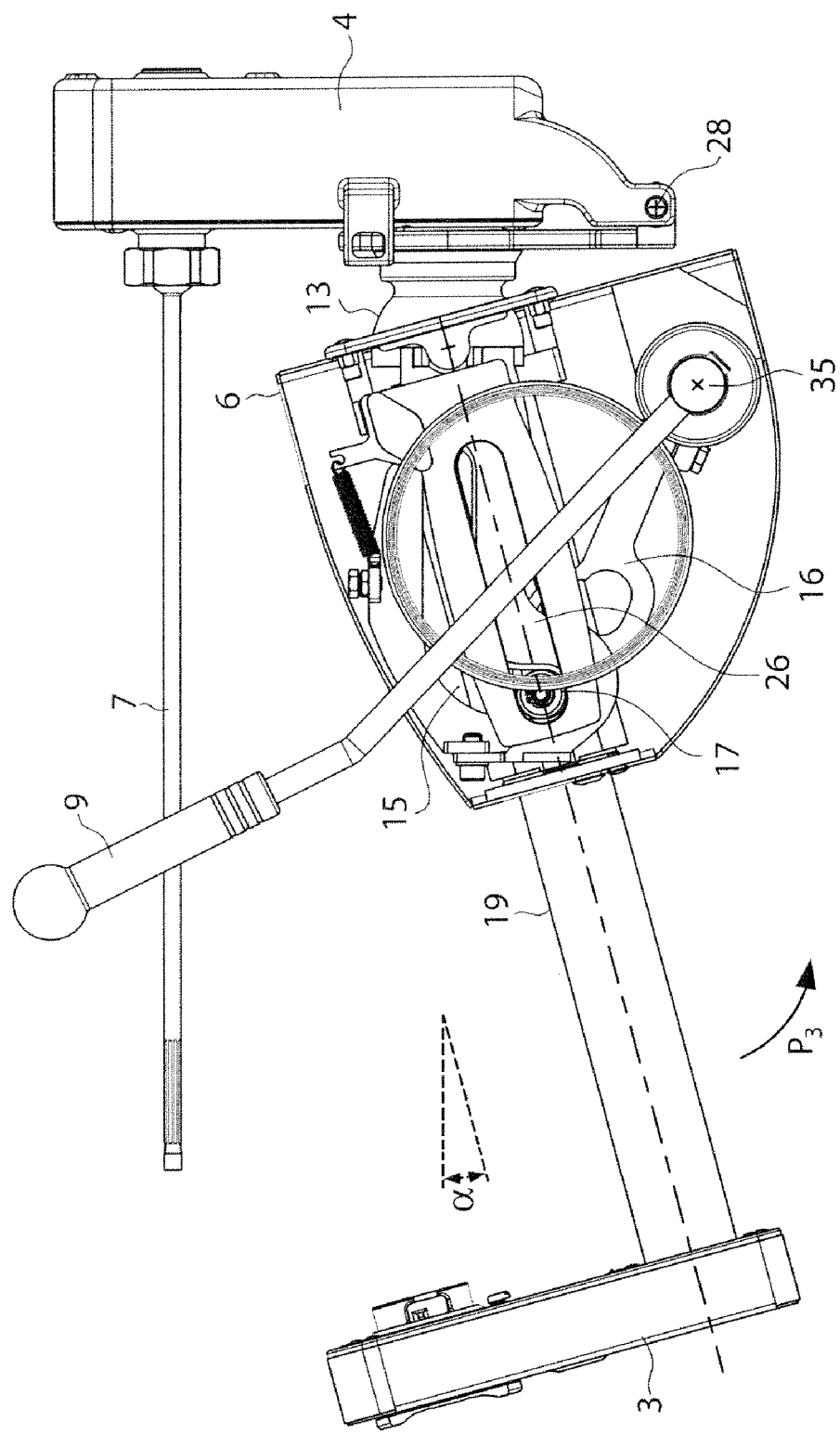
FIG. 6 shows the holding device according to FIG. 5 at a sausage casing pull-on position.

FIGS. 5 and 6 shows a view of the holding device from below, said view showing also the elements in the housing 6. The housing 6 can be provided with an opening 29.

A guide element 17, e.g. in the form of a roll 17, is provided in the interior of the housing 6 on the support tube 19, which has the head 3 secured thereto at its front end.

The holding device additionally comprises a guide means 15, 26, here in the form of a linked guide 15, 26, which is in this case provided in the plates 2, 25 e.g. in the form of an opening or through-hole. The guide means 15 provided in plate 2 comprises a straight portion $B_1$ extending in the axial direction at the position shown in FIG. 5 and a curved portion $B_2$ extending in accordance with a predetermined path.

In the case of this special embodiment, not only plate 2 is provided with a guide means 15, but an additional plate 25 exists that is provided with a further guide means 26, i.e. a second opening, in which the guide element 17 can be guided. The opening 26 comprises a straight portion, which extends along the support tube 19 and which is secured to the housing 6 such that it will be pivoted together with the support tube and the drive shaft 20.

The guide element 17 can be moved via a pivot means, especially in the form of the pivot lever 9, in the superimposed guide means 15, 26. The pivot lever is here attached to the lower surface of the housing 6.

It is also possible to pivot the head 3 of the holding device away automatically, e.g. at the end of a ruffled casing or after a predetermined number of ejected portions, by means of an actuator, e.g. a pneumatic cylinder, integrated in the housing 6. Repositioning at the operating position can then be carried out when a new sausage casing has been pulled on, either again automatically via the actuator or, for safety reasons, manually through the operator who uses the lever 9.

The pivot lever 9 and a shorter inner lever 16 positioned inside the housing are attached to a bearing journal 35 such that they are secured against rotation relative thereto. In this special embodiment, the lever is provided with an opening 18 in the end located opposite the journal. The guide element 17 is accommodated in said opening 18 and, when the pivot lever 9 is moved in the direction of the arrow $P_1$, it can be moved in the guide means 15 and 26 such that the guide tube 19 can move in the holder 11 (FIG. 2) in the direction of the arrow $P_1$ and, finally, along a curved path in the area $B_2$, this movement having the effect that, as indicated by arrow the holding device will pivot away from the longitudinal axis L.

The plate 25, which is shown in FIG. 5 and in FIG. 6 and which is provided with the guide means or opening 26, is rigidly connected to the housing 6. The plate 2 provided with the guide means or opening 15 is rigidly connected to the stationary segment of the joint 13. When the pivot lever 9 is moved in direction $P_2$, the support tube 19 will move in direction $P_1$ in the area $B_1$, i.e. out of the housing 6 in the axial direction. The housing 6 does not move in this case. When the pivot lever 9 is further pivoted in direction $P_2$, the support tube 19 will continue its movement in direction $P_1$, i.e. out of the housing 6 in the axial direction, in the area $B_2$. The housing 6 now moves simultaneously in direction $P_3$, i.e. away from the longitudinal axis L. The plate 25 including the opening 26 only has the function of preventing the head from tilting away about the axis of the support tube 19.

This arrangement provides the advantage that the movements can easily be combined with one another in an almost arbitrary manner.

Alternatively, the plate 25 including the opening 26 can be replaced by some other means for preventing the head 3 from tilting away due to a rotational displacement of the support tube 19 relative to the housing 6, e.g. by a displaceable polygon connection between the support tube 19 and the housing 6.

The present disclosure operates as follows:

When a specific number of sausages has been stuffed, ruffled casings must again be pulled onto the filling tube 7. The holding device first occupies the operating position shown in FIGS. 2 and 5, at which the casing brake 10 encloses the free end of the filling tube 7 and at which the drive shaft 20 is in an operating position, i.e. the shaft 20 is connected to the gear drive for the casing brake 10, in this case via the sleeve 32. The guide element 17 is located in the linear section $B_1$ of the guide means 15.

For exposing the free end of the filling tube 7, the pivot lever 9 is now grasped and moved in the direction of the arrow $P_2$ (cf. FIGS. 2, 5 and 9c). In the course of this movement also the inner arm 16 of the lever will move and push the guide element 17 in the direction of the arrow $P_1$ into the linear section $B_1$ of the guide means 15, 26. This has the effect that the support tube 19 moves out of the housing 6 in the axial direction by a predetermined length, e.g. 0 to 10 cm.

In the second section $B_2$, the linked guide is curved in shape, according to a predetermined path. It follows that, when the pivot lever 9 continues its movement in the direction of arrow $P_2$, the guide element 17 will move through the area $B_2$ of the guide means 15, 26. The guide element 17 moves until it strikes against the end of the area $B_2$ of the linked guide 15. In the case of the present specific embodiment, the openings in the first plate 2 and in the second plate 25 are arranged relative to one another in such a way that, at the end of the rotational movement of the pivot lever 9, the guide element 17 comes to lie in the end regions of the opening 15 as well as of the opening 26. The movement of the guide element 17 in the area $B_2$ automatically causes pivoting of the drive shaft 20, the housing 6, the support tube 19 and the head 3 in the direction of the arrow $P_3$. Thanks to the compensation element 12, the drive shaft 20 can be pivoted by the angle α without the necessity of decoupling the power train from the drive at the rear end of the drive shaft 20 at the coupling point B. As can be seen from a comparison between FIGS. 2 and 3, the support tube 19 is moved away from the drive shaft 20 by the above-mentioned motion mechanism, so that the sleeve 32 will be pulled off the drive shaft 20 to a certain extent in direction $P_1$, without being, however, decoupled therefrom.

For returning the head 3 to its operating position, the above sequence of operations is carried out in reverse order.

As has been explained hereinbefore, the head 3 can, with the aid of the guide means, first be moved linearly in the axial direction, and can then be pivoted in a direction away from the longitudinal axis L of the holding device 1 along a path. On this path, the head 3 executes preferably a superimposed movement in the axial direction and in at least one direction extending at an angle relative to the longitudinal axis L. By combining various guide means (paths), an arbitrary movement of the head 3 can be executed. The path of movement of the head lies preferably in a plane including the longitudinal axis L, preferably in a horizontal plane or a plane inclined relative to the horizontal plane by 0 to 90°.

Figure 4:
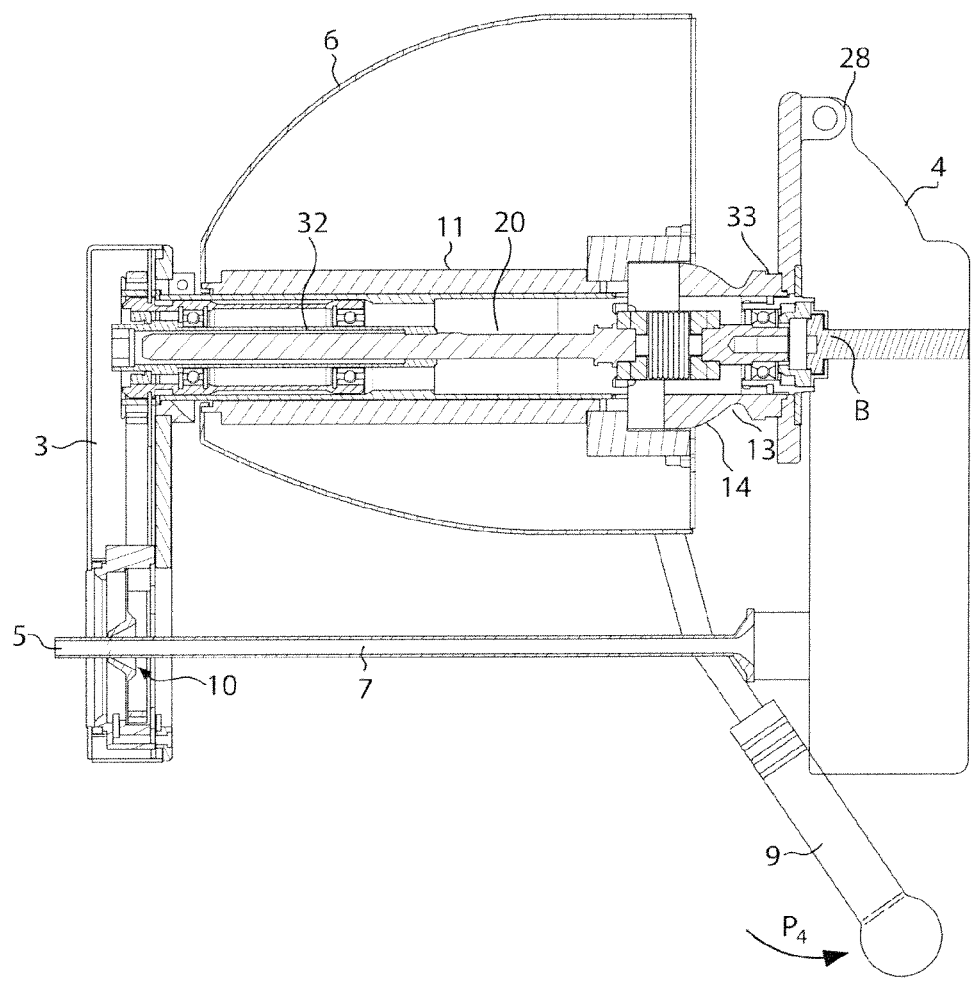
FIG. 4 shows the holding device according to FIGS. 2 and 3 at a threading position.
Figure 7:
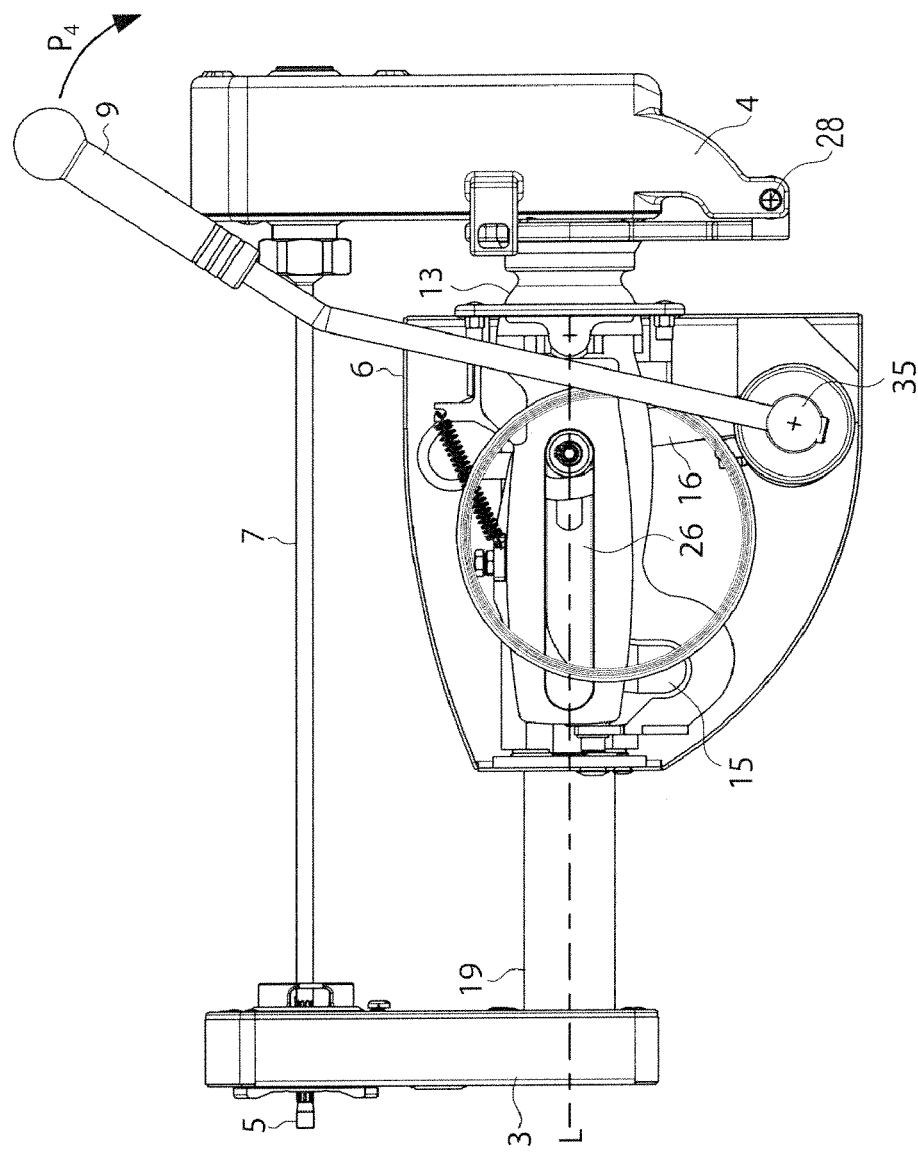
FIG. 7 shows the holding device according to FIGS. 5 and 6 at a threading position.

FIGS. 4 and 7 show the holding device in a so-called threading position. When occupying the threading position, the head is located even more closely to the housing 4 of the twist-off gear unit than at the operating position, so that the operator can grasp the end of the newly installed sausage casing more easily and make a knot, if necessary. In order to arrive at this position, the pivot lever is pivoted in the direction $P_4$, opposite to the direction indicated by arrow $P_2$, as can especially be seen from FIG. 7, so that the guide element 17 will here strike against the end of the guide means 15, 26. For the normal operating position, the pivot lever 9 is then returned to the position shown in FIGS. 3 and 5, where it can also be locked in position.

By means of the present disclosure, a combined movement consisting of linear and pivotal movements can be realized by superimposing various freely selectable paths. The axis of rotation is arranged such that a small pivot angle is obtained and that the power train need not be decoupled.

Figure 13:
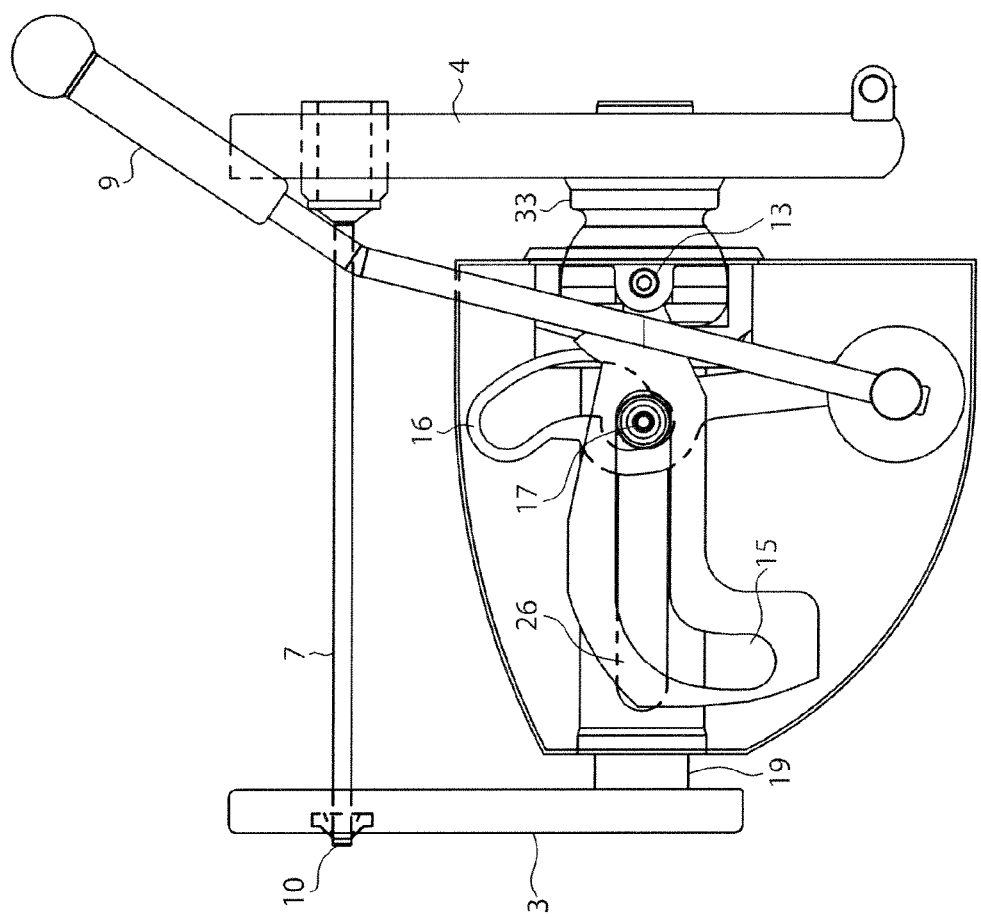
FIG. 13 shows a sectional view of a further embodiment of the present disclosure.

FIG. 13 shows a further embodiment according to the present disclosure. In the case of the holding devices 1 shown in FIGS. 1 to 12, the holding device includes a power train for the casing brake 10.

Other than in the case of the preceding embodiments, the brake ring according to the present embodiment is either stationary or supported in a freely rotatable manner, the brake ring being then driven by the filling tube 7 through frictional engagement. The pivoting mechanism shown in 13 corresponds to the pivoting mechanism shown in FIGS. 1 to 12 with the exception that no drive shaft for the casing brake is provided. Also in this case, the head 3 is held via a holder extending in the direction of the longitudinal axis L in the operating position. The holder is here the above-described support tube 19. The holder, i.e. the support tube 19, can again be pivoted by an angle α relative to the longitudinal axis L. The holder for the support tube 19 is supported in the housing 6 in an axially displaceable manner and is provided with a guide element 17 that moves in the linked guide 15, 26. Also this embodiment comprises the pivot lever 9, which can be used for moving the guide element 17 in the guide means 15, 26 in the same way as in the case of the preceding embodiment. Hence, the head 3 can first be moved linearly forward in the axial direction with the aid of the guide means, in particular the linked guide 15, 26, whereupon it can be pivoted in a direction away from the longitudinal axis L of the holding device along a path, which is here again a curved path. On this path, the head preferably executes superimposed movements in the axial direction, i.e. in the forward direction, and in at least one direction extending at an angle relative to the longitudinal axis L. It follows that also this holding device, which does not comprise a drive for the casing brake, allows the head to be pivoted skilfully from the operating position to a sausage casing pull-on position.

The invention claimed is:

1. A holding device for a stuffing machine for stuffing sausages, comprising
    a head provided with a casing brake, and
    a drive shaft through which the casing brake can be driven,
       the casing brake enclosing the free end of a filling tube of the stuffing machine at an operating position, and the casing brake exposing the free end of the filling tube by pivoting the head away at a sausage casing pull-on position, and
    when the head is being moved from the operating position to the sausage casing pull-on position, the drive shaft is deflected at an angle α relative to the longitudinal axis of the holding device without decoupling of the power train.

2. A holding device according to claim 1, wherein the angle α is an angle between 4° and 90°.

3. A holding device according to claim 2, wherein angle α is an angle between 10° and 45°.

4. A holding device according to claim 1, wherein with the aid of a guide means, the head is first moved linearly in the axial direction, and is then pivoted in a direction away from the longitudinal axis of the holding device along a path, the head executing on this path a superimposed movement in the axial direction and in at least one direction extending at an angle relative to the longitudinal axis.

5. A holding device according to claim 4, wherein the path extends in a plane including the longitudinal axis.

6. A holding device according to claim 5, wherein the path extends in the horizontal plane.

7. A holding device according to claim 4, wherein the guide means is realized by superimposing various guide means with various paths, and that the guide means is arranged in the form of a linked guide in at least one plate in the housing.

8. A holding device according to claim 4, wherein the guide manes is a linked guide.

9. A holding device according to claim 1, wherein the drive shaft is, at least partially, rotatably supported in a support tube, which is displaceably supported in a housing and at the front end of which the head is mounted, the support tube being provided with a guide element running in a linked guide, the holding device additionally comprising a pivot means with the aid of which the guide element can be moved in the guide means.

10. A holding device according to claim 9, wherein the pivot mans is in the form of a pivot lever.

11. A holding device according claim 1, wherein the holding device comprises a housing through which the drive shaft extends, the housing being provided with a joint of such a nature that it is movable at an angle relative to the longitudinal axis.

12. A holding device according to claim 11, wherein the compensation element is arranged in an area of the drive shaft.

13. A holding device according to claim 12, wherein the compensation element is arranged in an area within the joint.

14. A holding device according to claim 1, wherein the drive shaft comprises a compensation element which allows a deflection of the shaft relative to the longitudinal axis of >4°.

15. A holding device according to claim 14, wherein the compensation element is implemented as an axially resilient helical profile provided in the drive shaft.

16. A holding device according to claim 14, wherein the deflection is >5°.

17. A holding device according to claim 14, wherein the deflection is at least up to 45°.

18. A holding device according to claim 1, wherein the head is pivoted out automatically by means of an actuator.

19. A holding device according to claim 18, wherein the actuator is a pneumatic cylinder.

20. A holding device according to claim 1, wherein the holding device is fixedly connected to a housing of a twist-off gear unit.

21. A stuffing machine for stuffing sausages with a pasty mass, comprising a holding device for holding and positioning a casing brake according to claim 1, a hopper as well as a filling tube.

22. A method of positioning a holding device according to claim 1, wherein for moving the head of the holding device from the operating position to the sausage casing pull-on position, deflecting the drive shaft by an angle $\alpha$ relative to the longitudinal axis without decoupling the power train.

23. A method according to claim 22, and first moving the head linearly in the axial direction of the holding device, and then pivoting the head in a direction away from the longitudinal axis along a path, the head executing on this path a superimposed movement in the axial direction and in at least one direction extending at an angle relative to the longitudinal axis.

24. A method according to claim 22, and moving the head along a path extending in a plane which includes the longitudinal axis of the drive shaft.

25. A holding device according to claim 24, wherein the plane is a horizontal plane.

26. A holding device for a stuffing machine for stuffing sausages, comprising
a head provided with a casing brake, the casing brake enclosing the free end of a filling tube of the stuffing machine at an operating position and exposing the free end of the filling tube by pivoting the head away at a sausage casing pull-on position, and the casing brake being one of stationary or adapted to be driven via the filling tube, and
with the aid of a guide means, the head is first moved linearly in the axial direction, and is then pivoted in a direction away from the longitudinal axis of the holding device along a path, the head executing on this path a superimposed movement in the axial direction and in at least one direction extending at an angle relative to the longitudinal axis.

27. A holding device according to claim 26, wherein the guide means is a linked guide.

* * * * *

UNITED STATES PATENT AND TRADEMARK OFFICE
CERTIFICATE OF CORRECTION

PATENT NO.        : 8,277,293 B2
APPLICATION NO.   : 12/720045
DATED             : October 2, 2012
INVENTOR(S)       : Maile et al.

Page 1 of 1

It is certified that error appears in the above-identified patent and that said Letters Patent is hereby corrected as shown below:

In the Claims

In Column 10, Line 46, in Claim 1, delete "comprising" and insert -- comprising: --, therefor.

In Column 11, Line 12, in Claim 8, delete "manes" and insert -- means --, therefor.

In Column 11, Line 23, in Claim 10, delete "mans" and insert -- means --, therefor.

In Column 11, Line 24, in Claim 11, delete "according claim" and insert -- according to claim --, therefor.

In Column 12, Line 25, in Claim 25, delete "holding device" and insert -- method --, therefor.

In Column 12, Line 28, in Claim 26, delete "comprising" and insert -- comprising: --, therefor.

Signed and Sealed this
Eighteenth Day of November, 2014

Michelle K. Lee
*Deputy Director of the United States Patent and Trademark Office*